United States Patent Office 2,803,428
Patented Aug. 20, 1957

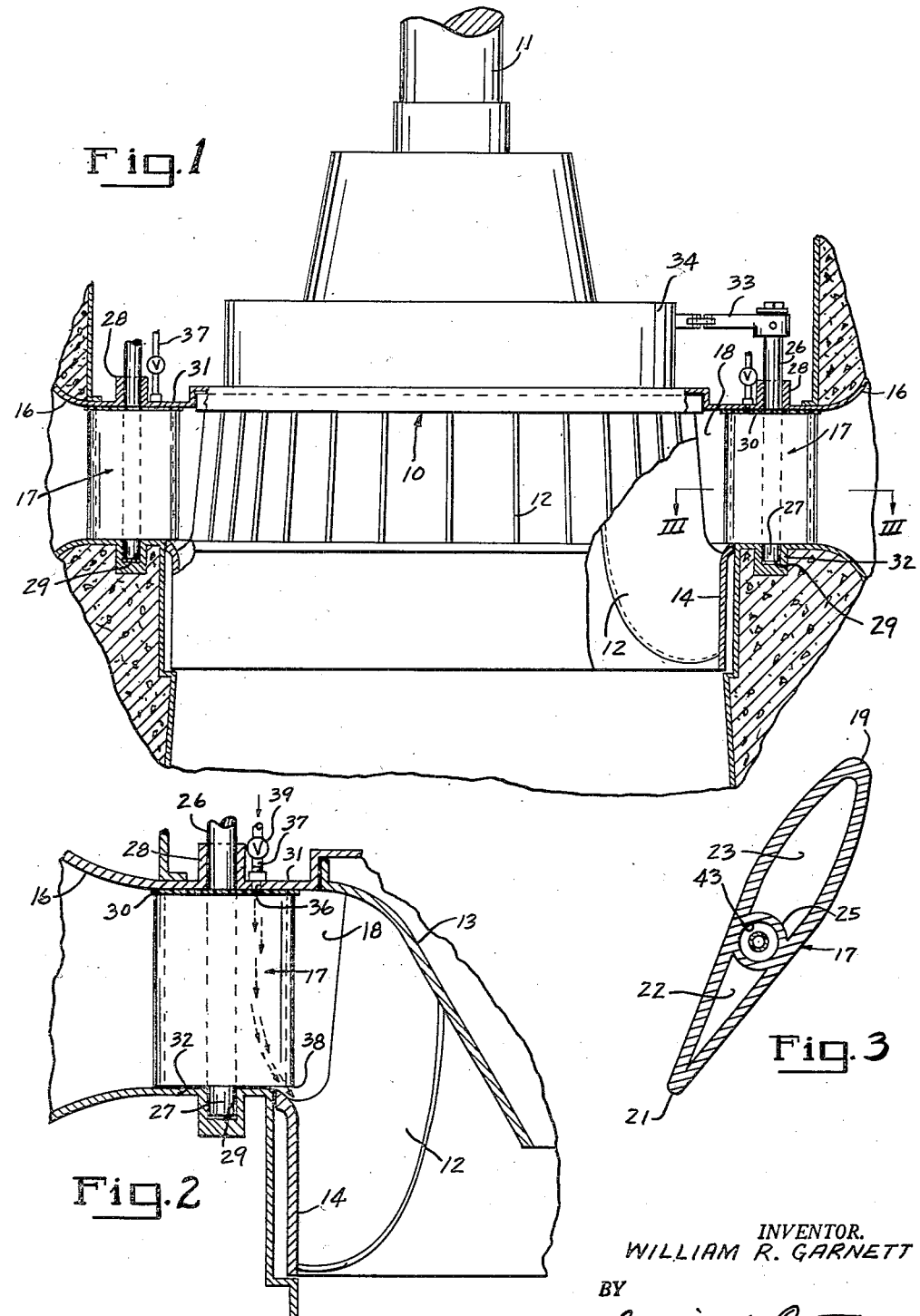

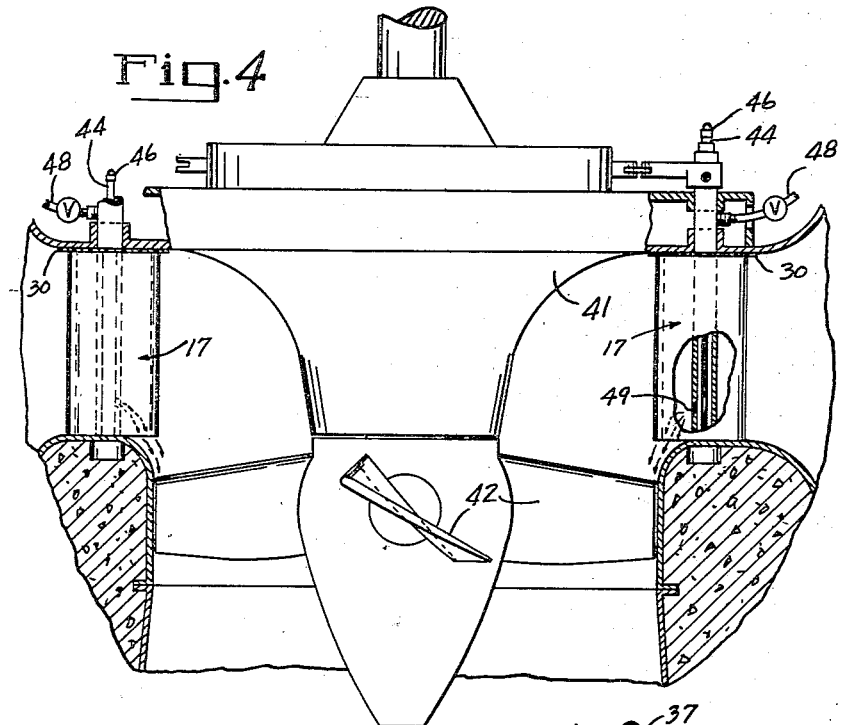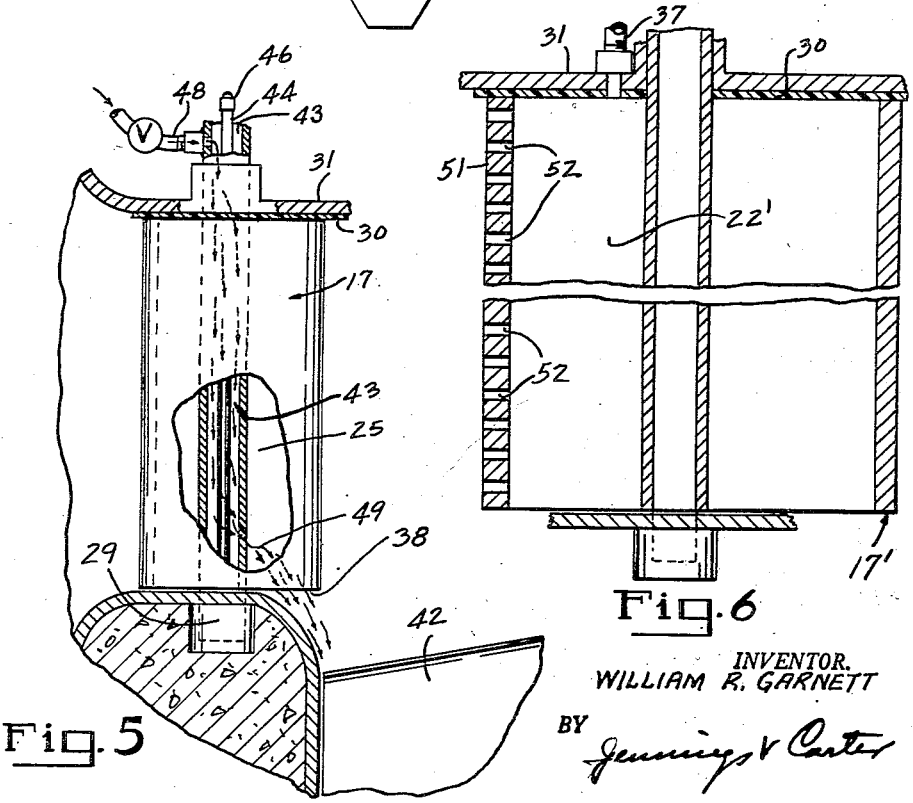

2,803,428

METHOD AND MEANS FOR MINIMIZING CAVITATION AND PITTING IN HYDRAULIC TURBINES

William R. Garnett, Birmingham, Ala.

Application July 21, 1952, Serial No. 299,949

3 Claims. (Cl. 253—26)

This invention relates to a method and means for minimizing the damaging effects of cavitation in hydraulic turbines, and has for an object the provision of a simple, effective method and means of the character designated which shall be readily applicable to turbines either of the reaction or the propeller and movable blade type.

A further object of my invention is to minimize the pitting in water wheels and to lessen vibration and noise by introducing air into the voids or low pressure areas which occur under the trailing edges of wicket gates on reaction and propeller and movable blade hydraulic turbines.

A still further object of my invention is to provide simple, effective means for passing air through the wicket gates of turbines during the operation thereof to be discharged at the trailing edges thereof and fill the voids formed by the passage of the water around the wicket gates.

As is well known in the art to which my invention relates, the physical dimensions of the angularly adjustable wicket gates divide the water passing from the scroll case into the turbine into streams which do not immediately reunite after leaving the gates because of their velocity. In cases where the wicket gates project beyond the shroud band of the runner in the area where the filaments of the water begin their turn toward the discharge ring of the turbine, the trailing edges of the wicket gates cause sizable voids, or low pressure areas under the trailing edges of the gates, which voids, or cavities, move on into the runner and, upon collapsing, cause pitting of the runner. The repair of turbine runners due to pitting is a serious item of expense in the operation of hydraulic turbines.

In accordance with my invention I raise the pressures in these low pressure areas or cavities under the trailing edges of the wicket gates by the introduction of air at atmospheric or higher pressures as may be required. The air introduced in the cavities prevents the collapse thereof and provides a cushion whish absorbs a portion of the shock, thereby reducing the pitting of the runner.

Illustrative means of carrying out my invention are shown in the accompanying drawings, forming a part of this application in which:

Fig. 1 is a sectional elevation showing a reaction type hydraulic turbine having my invention applied thereto;

Fig. 2 is a detail sectional view showing more in detail the passage of the air through the wicket gates;

Fig. 3 is an enlarged sectional view taken along the line III—III of Fig. 1;

Fig. 4 is a sectional view similar to Fig. 1 showing my invention applied to a propeller or movable blade type turbine;

Fig. 5 is an enlarged detail sectional view showing the manner in which the air is passed through the wicket gates; and, Fig. 6 is a detail sectional view of a wicket gate showing a further modification of my invention.

Referring now to the drawings for a better understanding of my invention, I show in Figs. 1 and 2 a hydraulic turbine comprising a runner 10 mounted on a shaft 11 and having buckets 12 supported from the crown 13 and the shroud band 14 of the runner. Water is admitted from the spiral case 16 and passes wicket gates 17 into the runner intake 18 where it strikes the buckets 12 and causes rotation of the turbine in the manner well understood.

Each of the wicket gates is streamlined in cross section, having a thicker dimension at its leading edge 19, Fig. 3, than at its trailing edge 21. The result of this construction is that water passing the gates is divided into streams which, underneath the gates at the trailing edges thereof, do not join immediately upon passing due to the velocity of the water, causing the formation of cavities, portions of which are entrained and move on with the water inwardly of the turbine. These cavities upon collapsing produce vibration and pitting of the runner. The wicket gates, as shown in Fig. 3 of the drawings, are usually made of steel and are made hollow as shown at 22 and 23 in order to reduce weight and save material. Extending lengthwise near the middle of each wicket is a cylindrical portion 25 which forms a gate stem which extends above and below the wicket gate as shown at 26 and 27.

The wicket gates are angularly adjustable, as is well understood, being mounted on the gate stems which project above and below the wicket gates as shown at 26 and 27 in Fig. 2.

The gate stems are carried in suitable bearings 28 and 29, the bearing 28 being formed in the head cover 31 and the bearing 29 in the bottom ring 32 of the turbine casing. There may also be placed at the top of the wicket gates packing material 30, which co-operates with the head cover 31 as shown in Fig. 1 to form a seal around the top thereof and prevent leakage of water into the wicket gates. The wicket gates are angularly adjustable by means of gate levers 33 which are suitably connected to a gate operating ring 34.

In accordance with one form of my invention, I provide a hole 36, Fig. 2, in the head cover 31 of the turbine and connect a pipe 37 thereto which connects with the cavity 22, Fig. 3, of the wicket gate 17 during the principal operating positions of the wicket gates. Air is admitted through the pipe 37 into the cavity 22 and passes down through the wicket gate as indicated by the arrows in Fig. 2 to be discharged at the lower end through the overhanging portion 38 of the wicket gate. The air introduced may be at atmospheric pressure or higher and its admission is controlled by means of a valve 39. While I have shown the valve 39 in the pipe 37 adjacent the wicket gate, it will be understood that it may be pieced at any suitable location. It will be seen that air passing down through the hollow portion 22 in the wicket gate passes directly into the cavities or low pressure areas formed in the water stream by the wicket gate to fill the cavities and increase the pressures in the low pressure areas there formed.

Referring now to Figs. 4 and 5 of the drawing, I show a propeller type turbine having a runner 41 with a plurality of blades 42 which may, or may not be adjustable as to pitch. The arrangement and the operation of the wicket gates 17 is similar in this type of turbine to that illustrated in Figs. 1 to 3 of the drawings and the description thereof need not be repeated. In accordance with this modification, I show the hollow cylindrical portion 25 for the wicket gate 17 with a lubrication pipe 44 extending downwardly therethrough to lubricate the lower bearing 29 of the gate stem. A lubricant fitting 46 is applied to the top of the pipe 44. The pipe 44 is smaller in diameter than the hollow cylindrical portion 25 so that there is provided a passage 43 surrounding the pipe 44. In accordance with my invention I may introduce air through a pipe 43 which is connected through the cylindrical portion 25 of the wicket gate to the passage 43 and the air passes thence downwardly therethrough. I also drill a hole 49 through the wall of the hollow portion 25 of the wicket gate so that the air passing down through the hollow portion passes through the hole 49 and thence passes out through the overhanging portion 38 of the wicket gate. The stream of water passes downwardly to strike the blades 42 and cause rotation of the turbine runner and with it the air passing into the voids formed by the wicket gates 17 so that there is no sudden collapse of the voids to cause shock and pitting of the turbine blades 42.

In carrying out my invention, I may supply air to some, or all of the wicket gates, depending upon the velocity of flow of the water and the cavitation problem presented. Preferably, air is supplied to all of the gates.

Referring to Fig. 6 of the drawing I show a still further modification of my invention in which the trailing edge 51 of the wicket gate 17' is provided with a plurality of holes 52 leading into the hollow portion 22'. Otherwise the wicket gate 17' is constructed similarly to the wicket gates 17 heretofore described, and air is admitted to the hollow portion 22 as shown in Figs. 1 and 2.

From the foregoing it will be apparent that I have devised an improved means for minimizing the damaging effects of cavitation in hydraulic turbines which is simple and effective and readily applicable to existing, as well as to new installations.

While I have shown my invention in several forms, it will be obvious to those skilled in the art that it is not so limited but is susceptible of various other changes and modifications without departing from the spirit thereof, and I desire, therefore, that only such limitations shall be placed thereupon as are specifically set forth in the appended claims.

What I claim is:

1. The combination with a hydraulic turbine of the type embodying a housing with a fluid passage therethrough and a runner in the passage and hollow wicket gates mounted ahead of the runner said gates overhanging in part the fluid passage, of conduits leading from outside the turbine to the upper ends of the wicket gates, means operatively to connect the conduits substantially air tight to said upper ends of the hollow wicket gates, and means to supply air through the conduits whereby at least a part of the air supplied thereto flows through the wicket gates and discharges endwise therefrom into the fluid passage ahead of the runner.

2. The combination with a hydraulic turbine of the type embodying a housing having a fluid passage therethrough controlled by wicket gates mounted in spaced relation around the fluid passage and overhanging in part said fluid passage, said wicket gates having vertical passages therethrough along their trailing edges, and a runner mounted in the fluid passage carrying turbine blades which have leading edge portions located inwardly and downwardly from the lower ends of the wicket gates, of conduits leading from outside the turbine to the upper ends of the wicket gates, means connecting the conduits to the upper ends of the wicket gate passages, and means to supply air to the conduits whereby air is discharged through the wicket gates into the fluid passage ahead of the blades, thereby to reduce cavitation of the blades.

3. The combination with a hydraulic turbine of the type embodying a housing with a fluid passage therethrough and a runner in the passage and hollow wicket gates mounted in spaced relation around the passage and having their trailing edges overhanging a part of the runner, of conduits leading from outside the turbine to the upper ends of the wicket gates, means operatively to connect the conduits substantially air tight to said upper ends of the hollow wicket gates, and means to supply air through the conduits whereby it flows through the wicket gates and discharges endwise therefrom over the runner.

References Cited in the file of this patent

UNITED STATES PATENTS

| | | |
|---|---|---|
| 1,823,624 | Nagler | Sept. 15, 1931 |
| 1,860,618 | Nagler | May 31, 1932 |
| 2,079,258 | Kerr | May 4, 1937 |
| 2,295,495 | Anderson | Sept. 8, 1942 |
| 2,625,367 | Rainbow et al. | Jan. 13, 1953 |

FOREIGN PATENTS

| | | |
|---|---|---|
| 7,544 | Germany | Mar. 16, 1879 |
| 498,572 | Belgium | Feb. 1, 1951 |
| 878,999 | France | Nov. 2, 1942 |